United States Patent Office

3,459,595
Patented Aug. 5, 1969

3,459,595
POSITIVE ELECTRODE FOR LEAD ACID
STORAGE BATTERIES
Herbert Haebler, Frankfurt am Main, Germany, assignor to Varta Aktiengesellschaft, Frankfurt am Main, Germany
No Drawing. Filed Mar. 20, 1967, Ser. No. 630,170
Claims priority, application Germany, Mar. 19, 1966,
V 30,674
Int. Cl. H01m 39/04
U.S. Cl. 136—26                                5 Claims

ABSTRACT OF THE DISCLOSURE

A positive electrode for a lead acid storage battery, the active mass of which includes boric acid in an amount sufficient to prevent the taking up of atmospheric $CO_2$ by the positive active mass, and the method of producing such electrode by either dusting the positive active mass with pulverulent boric acid or treating the positive active mass with a boric acid solution by immersion or spraying.

BACKGROUND OF THE INVENTION

The present invention relates to lead acid storage batteries and more particularly to the positive electrodes thereof. It is an object of the present invention to prevent the loss of charge of formed positive electrodes which occurs upon storage, particularly under adverse climatic conditions.

Since it has become possible to produce negative electrodes of lead acid batteries which can be stored for prolonged periods of time due to their content of boric acid serving as an anti-oxidant, it has been found that the formed positive plates of lead acid storage batteries lose part of their capacity when stored under exposure to the surrounding air, whereby simultaneously a severe increase in the inner resistance takes place and the starting potential of such plates determined against cadmium shows a significant drop as compared with similar plates which had not been subjected to prolonged storage.

Experiments have shown that lead acid batteries which were stored at 40° C. in an atmosphere of high humidity, comparable to conditions prevailing in tropical climates, are subject to particularly rapid drop of the starting potential of the positive plates. As will be described in more detail below, this drop of the starting potential appears to be due to an increase in the resistance of the positive active mass due to the taking up of atmospheric $CO_2$ under formation of basic lead carbonates.

A lead acid battery which can be stored for prolonged periods of time without changing its characteristics requires, therefore, not only prevention of oxidation of the negative electrodes but also protection of the active positive mass of the positive electrodes against carbonate formation.

By carrying out prolonged storage experiments under tropical conditions at 40° C. in an atmosphere of high humidity with lead acid storage batteries, the cell openings of which were maintained in closed or in open condition, it was determined with certainty that the discharge voltage curve, even after storage for only a few months, is considerably lower if the cells are not stored in sealed condition. When exposed to moist air at 40° C., $CO_2$ is taken up and reacted with the positive active mass.

It has been attempted, therefore, to prevent during prolonged storage the formation of lead carbonates at the positive electrodes by maintaining the active mass of the positive plates in acid condition. This can be accomplished by only incomplete washing of the plates. It was then found that plates of this type would not take up atmospheric $CO_2$ during storage, and if the plates are dried without heating and while exposed to air, the acid condition of the plates is maintained for many months. However, if such positive plates in acid condition are dried at 100° C., even for a short period of time such as eight minutes, the acid condition of the active positive mass is lost due to the formation of lead sulfate and the protective effect of the free sulfuric acid is no longer available. Sulfuric acid is not suitable for this purpose because, particularly at the positive plates, upon prolonged storage a short-circuited element is formed in the presence of the electrolyte between the active mass and the grid, and this will lead over a prolonged period of time to the formation of lead sulfate between grid and mass. This, too would cause over prolonged periods of time an increase in the inner resistance. A further disadvantage connected with the use of sulfuric acid for maintaining the positive electrodes in acid condition will be found in the fact that the plates will have an acid reaction only as long as there is sufficient moisture in the plates. However, in dry charged storage batteries, i.e. in storage batteries with formed plates but without liquid electrolyte, it is desirable to keep the moisture content as low as possible.

It is therefore an object of the present invention to provide a lead acid storage battery, and particularly formed positive electrodes thereof which will not take up atmospheric $CO_2$ upon storage under adverse atmospheric conditions and which are not subject to the above-discussed disadvantages.

SUMMARY OF THE INVENTION

The present invention proposes for use in a lead acid storage battery a positive electrode which may be in formed condition and which includes a positive active mass and an amount of boric acid in contact with the positive active mass, which amount will be sufficient to substantially prevent the taking up of atmospheric $CO_2$ by the positive electrode.

The present invention is also concerned with the method of incorporating boric acid in the positive electrode which may be carried out by dusting the positive active mass with pulverulent boric acid, or by treating the active mass with a boric acid solution, preferably an aqueous solution. Such liquid treatment may be carried out by immersion of the positive active mass or the entire positive electrode in a solution, preferably an aqueous solution, of boric acid, or by spraying the active mass with boric acid solution.

According to a preferred embodiment of the present invention, immersion of the positive electrode in boric acid solution is carried out repeatedly, whereby the concentration of the boric acid is varied in the individual immersion steps.

DESCRIPTION OF THE PREFERRED EMBODIMENT

As explained above, sulfuric acid is not suitable for maintaining a slightly acid condition of the positive active mass of a lead acid storage battery during storage prior to introduction of the electrolyte. In view thereof, the present invention proposes to use a slightly acidic inorganic acid which, upon drying of the positive electrode, will not be completely reacted under formation of a lead-acid compound, and thus will remain available during prolonged storage for endowing the formed active mass with acidic properties.

According to the present invention, for the reasons explained above, the active mass of the formed positive electrode of the lead acid storage battery is treated with boric acid. Surprisingly, it has been found that by such treatment with boric acid, carbonate formation on the formed positive electrode during storage in dry condition can be avoided. This is particularly surprising, in view of the fact that boric acid up to now was used only for prevention of oxidation of the negative active mass, and constitutes a highly significant advance in the art. It is a particular advantage of the present invention that the treatment of the positive active mass is carried out with a reactant which already is used for the treatment of the negative active mass so that one and the same reactant may now be used for the treatment of the positive as well as the negative electrode.

The fact that the formed positive electrode without the addition of boric acid does take up $CO_2$ is also shown by the following:

The data described in the table below were obtained upon storing positive electrodes in lead acid battery containers which, in one series of tests, were hermetically sealed and in the other series of tests were open and thus exposed to the surrounding atmosphere. Storage was carried out in a moist atmosphere at 40° C. The starting potential, residual capacity and potential against cadmium were determined.

TABLE

| | Open Housing | Sealed Housing |
|---|---|---|
| Temperature increase of the acid (° C.) | 27 | 27 |
| Starting potential at 3.5 $K_{20}$ (v.) | 4.30 | 5.0 |
| Capacity at 3.5 $K_{20}$ (sec.) | 215 | 230 |
| Potential of the pos. electrode against cadmium (v.) | 1.65 | 1.91 |
| Potential of the neg. electrode against cadmium (v.) | 0.28 | 0.28 |

The table clearly shows the effect of $CO_2$ (atmospheric $CO_2$) on the starting potential and capacity of the positive electrode.

The treatment of the positive, formed electrodes in accordance with the present invention may be carried out in various ways.

It has been found that good results are obtained by immersing the formed positive electrodes in boric acid solutions, preferably aqueous solutions, which may be of a wide range of concentration of boric acid, broadly containing between about 5 and 100 grams of boric acid per liter and preferably containing between 20 and 50 grams of boric acid per liter.

Impregnation of the positive active mass with boric acid may be carried out by watering the positive plates, after conventional formation, in flowing water and thereafter immersing the plates for a period of up to about one hour in a boric acid solution. Thereafter, the plates are dried, either in a drying device such as a furnace or directly by exposure to air.

However, it is also possible to apply the boric acid solution by spraying, and the latter method is particularly advantageous for moving belt production lines.

Particularly good results are achieved by repeating the immersion or by spraying several times, preferably with boric acid solutions of varying concentrations.

It is, however, also possible to apply the boric acid by dusting the formed positive electrodes with finely pulverulent boric acid.

Carbonate formation is prevented by previous immersion of the positive active mass in 3–5% boric acid.

Since boric acid, due to its very weakly acid characteristics, reacts with the active positive mass only to a very slight degree, even during drying at high temperatures only a very small proportion of basic lead borate is formed, so that a sufficient proportion of free boric acid remains in the active positive mass to endow the same with the slightly acid characteristics required in order to prevent carbonate formation.

Protection of the positive plates against carbonate formation is not only important during storage of the complete storage batteries, particularly at somewhat elevated temperatures such as about 40° C., but primarily for storage of freshly formed twin and single plates or already welded plate sets prior to installation of the same. A particularly unfavorable effect is exercised by the carbon dioxide on such plates in cases where the plates are stored on pallets in locations adjacent to the area where formation of the plates takes place. Since carbon dioxide is of higher specific gravity than air, a higher concentration of harmful carbon dioxide will accumulate in the vicinity of the floor of the storage chamber. This is due to the fact that during the first ten hours or so of forming the electrodes nearly no hydrogen and oxygen gases are developed, and nearly all of the escaping gas consists of carbon dioxide. The thus formed carbon dioxide passes during the curing process into the plates and large proportions thereof are bound by the plates, unless the same are protected as described above.

By simple immersion of the positive as well as the negative plates is a boric acid solution, oxidation at the negative electrodes and formation of basic lead carbonate at the positive electrodes is prevented and in this manner a storage battery is produced which even upon prolonged storage does not show any change in the characteristics of the positive and negative plates. The starting potential remains at its unchanging high initial value even if such batteries are stored in storage facilities which during the summer may reach temperatures of about 40° C.

As pointed out above, it is a particular advantage of the method of the present invention that the same material, i.e. boric acid, may be used for maintaining the charged condition of the positive and the negative electrodes. The possibility of treating the electrodes of opposite polarity with one and the same reactant greatly facilitates and simplifies production methods.

The concentration of boric acid in the positive active mass may range from a minimum of 0.15% to a maximum of 7%, preferably about 1%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a sulfuric acid electrolyte lead acid storage battery, in combination, a positive electrode including positive active mass and containing at least in the region of its surface boric acid before introduction of said electrolyte in said battery, said boric acid being present in an amount sufficient to substantially prevent taking up of atmospheric $CO_2$ by said positive electrode during storage under atmospheric conditions.

2. A lead acid storage battery as defined in claim 1, wherein said positive electrode is in formed condition.

3. A lead acid storage battery as defined in claim 2, and including a negative electrode having boric acid incorporated in the active mass thereof.

4. A lead acid storage battery as defined in claim 2, wherein said amount of boric acid is equal to between about 0.15% and 7% of the weight of said positive active mass.

5. A lead acid storage battery as defined in claim 4, wherein said amount of boric acid is equal to about 1% of the weight of said positive active mass.

References Cited

UNITED STATES PATENTS

| | | | |
|---|---|---|---|
| 458,425 | 8/1891 | Lugo | 136—26 |
| 2,996,563 | 8/1961 | Haebler | 136—27 |

WINSTON A. DOUGLAS, Primary Examiner

C. F. LE FEVOUR, Assistant Examiner

U.S. Cl. X.R.

136—120